Feb. 21, 1956  L. BOOR ET AL  2,735,297
PAPER HUMIDITY EXPANSION APPARATUS
Filed May 12, 1954  2 Sheets-Sheet 2
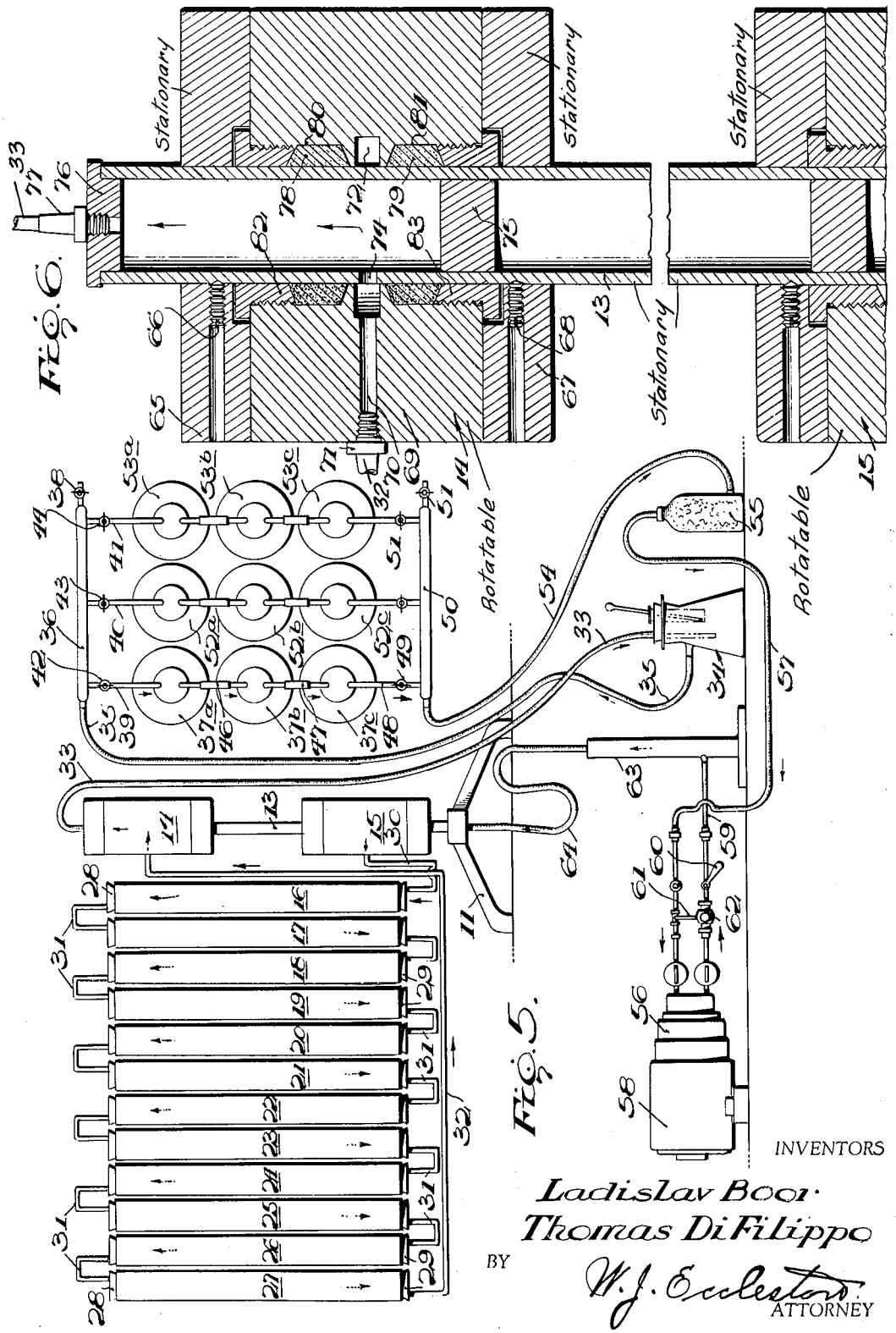
INVENTORS
Ladislav Boor
Thomas DiFilippo
BY
W. J. Eccleston
ATTORNEY

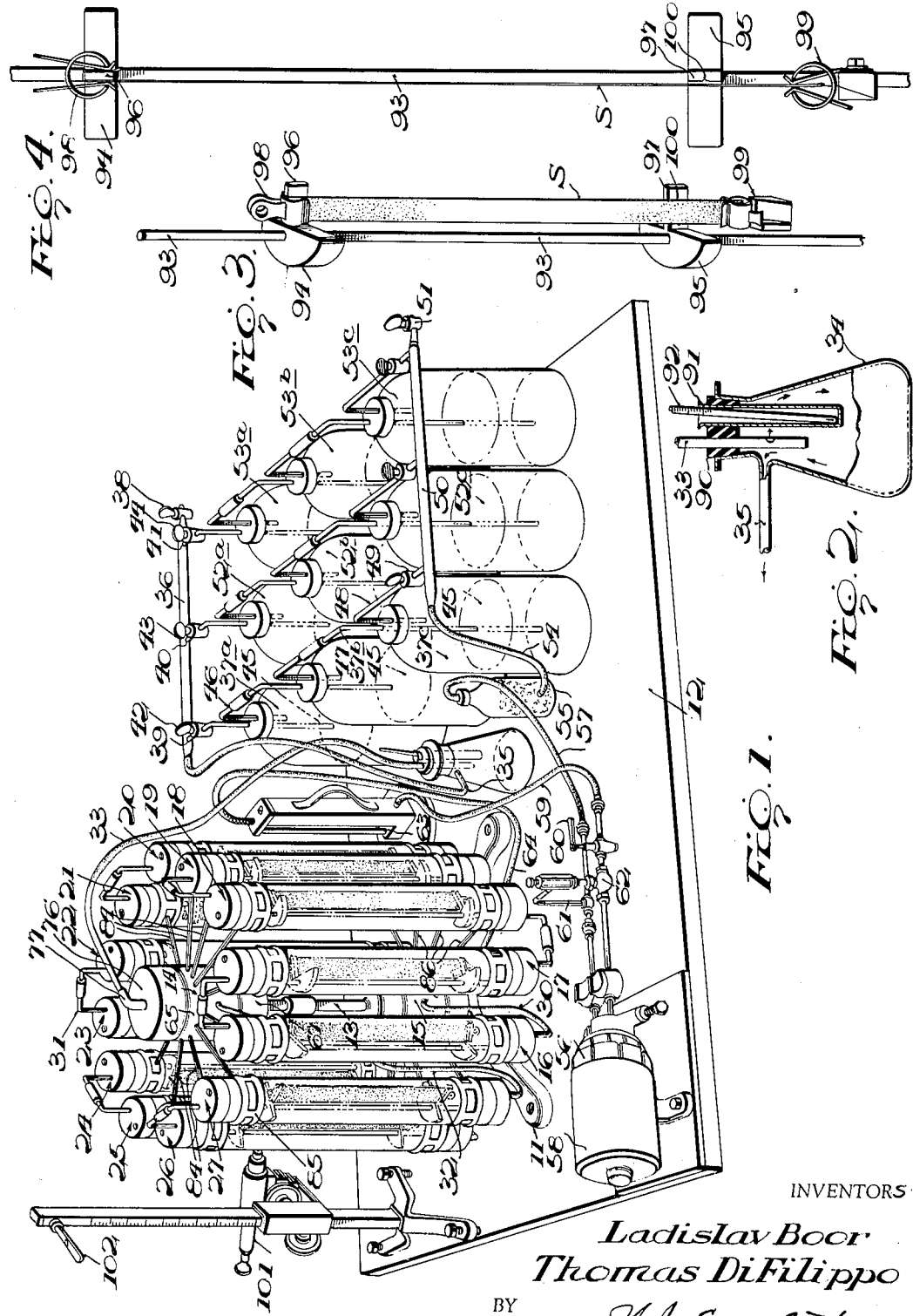

United States Patent Office 2,735,297
Patented Feb. 21, 1956

2,735,297

PAPER HUMIDITY EXPANSION APPARATUS

Ladislav Boor, Bethesda, Md., and Thomas Di Filippo, Philadelphia, Pa., assignors to the United States of America as represented by the Secretary of the Army Application May 12, 1954, Serial No. 429,414

7 Claims. (Cl. 73—159)

(Granted under Title 35, U. S. Code (1952), sec. 266)

The invention described herein, if patented, may be manufactured and used by or for the Government for governmental purposes, without the payment to us of any royalty thereon.

The present invention relates to apparatus for facilitating the measurement of the dimensional stability of paper and other organic or inorganic sheet material specimens under controlled humidity conditions.

It is important that paper on which maps, charts, multicolor illustrations, etc., are printed should remain dimensionally stable when subjected to varying humidity conditions during and after the printing process. Hence papers of different compositions have been studied under controlled humidity conditions, and apparatuses have been designed for facilitating this study. One such apparatus is disclosed in Patent No. 1,885,209, issued November 1, 1932, to The Bristol Company of Waterbury, Conn. Another is described in Research Paper RP1054 entitled "New Test for Dimensional Changes in Offset Papers," by Charles G. Weber and Martin N. V. Geib (J. Res. Nat. Bur. Stand., vol. 19, pp. 665–673). Also there is the National Bureau of Standards—Albert, "Expansimeter," Catalog No. 233, Thwing-Albert Instrument Co., Philadelphia, which has been used in several laboratories for the purpose stated.

The present invention aims to provide apparatus which minimizes the volume of circulating air of controlled humidity, thus making possible faster attainment of equilibrium between the sheet material and the circulating air and more rapid readings of the paper expansion or contraction. Another object is to provide apparatus which will permit a nice control of the humidity of the circulated air, and over a wide range.

Another object is to make possible the use of small specimens of the sheet materials under test. A further object is to make possible and convenient the testing of as many as twelve or more specimens (which may be specimens of different sheet materials) with one set-up of the apparatus. A still further object is to ensure sufficient accuracy in the readings, the preferred apparatus affording an accuracy of 1 part in 6500. Other objects will be understood from the following description of the preferred embodiment of the invention shown in the accompanying drawings forming a part of this specification.

In said drawings,

Fig. 1 is a perspective view of the entire apparatus;

Fig. 2 is a detail partly in vertical section of the dew-point-indicating flask;

Fig. 3 is a perspective view of one of the specimen holders, with a strip of paper supported thereby as for testing;

Fig. 4 is an elevation, on a larger scale, of a specimen holder and a strip of paper;

Fig. 5 is a diagrammatic view, parts being in elevation and other parts being in plan, showing particularly the flow of air through the apparatus; and Fig. 6 is a section on an enlarged scale of portions of the central two-part hub and its supporting hollow shaft, the upper end of the shaft having a slightly different construction from the one illustrated in Fig. 1.

Before entering into a detailed description of the construction, a general description may be helpful. The apparatus includes a plurality of vertical, air-tight, specimen-holding tubes having transparent walls, a central two-part hub supporting the tubes so that they may be rotated about the axis of the central hub, a motor-driven air pump, pipes or tubing for circulating air to and from each of the vertical sealed tubes, a battery of vessels containing solutions which will impart the desired humidity to the air circulated by the pump, a dew-point flask for measuring the humidity of the circulating air stream, a filter to prevent any solution from reaching the air pump, and a microscope for observing the dimensional change of each specimen as the glass tube containing it is moved into the line of vision of the operator looking through the microscope.

Referring to Figs. 1 and 5, the apparatus includes a stand 11 which sits on a table or like support 12 and which supports a vertical hollow shaft 13 that serves both as an air conduit and as an axle for the rotatable hubs 14, 15. A set of twelve hollow testing tubes 16–27 are supported by the rotatable hubs and have stoppers 28 sealing their upper ends and stoppers 29 sealing their lower ends, so that all the tubes may be opened at either end and may be connected or disconnected from the assembly. These testing tubes are preferably glass cylinders having good optical qualities, since these tubes must provide a clear view of certain markings located inside them, as will be explained; these tubes may be about 54 mm. in diameter and about 35.5 mm. in length. In lieu of twelve tubes, any convenient number may, of course, be employed. Each testing tube is adapted to enclose one specimen holder and one specimen and to seal off the atmosphere so that the specimen is subjected only to air of controlled, predetermined humidity. A tube 30 couples the bottom of testing tube 16 with the lower hub 15 and other tubes 31 connect the testing tubes 16–27 in series, so that the circulating air enters the first tube 16 at the bottom, flows through it past the specimen and out the top, then enters the next adjacent tube 17 of the series at the top, flows down through tube 17 past the specimen and out the bottom, then enters the bottom end of the third tube 18, and so on to the last testing tube 27 which discharges the air from its bottom end to a tube 32 that connects with the upper hub 14.

From the upper hub 14 the air flows through a tube 33 to a dew-point-indicating flask 34 (to be presently described) thence through a tube 35 to a header 36 which feeds air to a battery of sealed jars or bottles, preferably at least nine in number. A stopcock 38 is provided at the extremity of header 36. Leading off from header 36 are three or more tubes 39, 40, 41 each of which has a stopcock 42, 43, 44 respectively. Thus flow of the air may be directed to any one of the tubes 39, 40 and 41. In Fig. 5, stopcocks 43 and 44 are shown shut while stopcock 42 is shown open, so that the air will flow into the bottle 37a, will bubble through the solution 45 contained therein (Fig. 1), then will rise through the bottle and flow out through a tube 46 to the second bottle 37b, thence through the same solution 45 and then out of the second bottle, then through a tube 47 to the third bottle 37c, and through the same solution 45 in the third bottle and out through tube 48 having a stopcock 49. A header 50 receives the air discharged by tube 48 and a stopcock 51 is provided at the extremity of header 50. Two other sets of three bottles each 52a, 52b, 52c and 53a, 53b, 53c are coupled in parallel between the headers 36 and 50, exactly in the same way as has been described in connection with bottles 37a, 37b, 37c. Obviously as many sets of solution-containing bottles will be employed as may be convenient for the tests to be run. The solution 45 preferably differs in each set of three bottles so as to make possible a control of the humidity imparted to the air. For example the first set of bottles 37a, 37b, 37c may contain a saturated solution of magnesium chloride $MgCl_2.6H_2O$ to give the air bubbled through it 32% relative humidity. The second set 52a, 52b, 52c may contain a saturated solution of sodium nitrite $NaNO_2$ to impart 63% relative humidity. The third set 53a, 53b, 53c may contain a saturated solution of mono-ammonium phosphate $NHH_2PO_4$ to give the air 94% relative humidity. Any other liquids or liquid mixtures or solutions imparting the desired humidities may be used, or pure water may be used. Obviously the arrangement of the apparatus is such that different sets of bottles may be coupled to the headers as replacements without necessarily shutting down the operation of the apparatus. The stopcocks 38 and 51 permit pressure balancing when the pump is stopped, and also permit ambient conditions, usually 50% relative humidity, surrounding the apparatus to be circulated thru the system without disturbing the testing tubes.

From header 50, the humidified air flows through a tube 54 to a filter bottle 55 containing a quantity of glass wool or other inert fibrous material to catch any entrained droplets which may be carried along by the flowing air, thus preventing such moisture from damaging the air pump 56 to which bottle 55 is coupled by a tube 57. An electric motor 58 drives pump 56. The pressure side of pump 56 delivers air to a pipe line 59 having a throttling valve 60 which may be used to regulate the air flow through the system. An adjustable by-pass 61 leads to tube 57 on the exhaust side of the pump; thus the air pressure in the system is further controlled. A pressure relief valve 62 may also be provided at this point, as shown in Fig. 1. Pressure line 59 discharges to a flow meter 63. Regulation of the air flow by the flow meter (preferably at a rated 8 to 10 liters per minute) is possible because of the pressure relief valve 62 and the by-pass 61. From the flow meter, the air travels through a tube 64 to the lower hub 15 to complete the circuit.

Referring to Fig. 6, the upper hub 14 is fully shown, while only the upper end of the lower hub 15 is shown, as the lower hub is exactly like the upper. Hub 14 comprises a circular disk 65 which is secured by a setscrew 66 to the vertical hollow stationary shaft 13, a second circular disk 67 likewise secured by a setscrew 68, both circular disks being horizontal, and a rotatable cylindrical block 69 located between the two disks and surrounding shaft 13. An air passage 70 extends radially through block 69 and tube 32 is connected to air passage 70 by a coupling 71. At its inner end, air passage 70 discharges into an annular passage or groove 72 which surrounds the vertical hollow shaft 13. A port 74 is provided in shaft 13 at this point, so that air discharged from tube 32 enters the hollow shaft 13 no matter what the angular position may be of rotatable block 69. A plug 75 seals the hollow shaft below port 74, so that the air can only flow out through the upper end of the hollow shaft. A flanged plug 76 is shown in Fig. 6 as closing the upper end of shaft 13 and a coupling 77 screwed into the flanged plug 76 is shown as securing tube 33 to the upper hub. Also the upper end of shaft 13 is shown as extending above the upper disk 65. In lieu of plug 76, the hollow shaft 13 may be directly coupled at its upper end to tube 33, as shown in Fig. 1, and the upper end of shaft 13 may be flush with the top surface of the upper disk 65 as there shown. A pair of annular packings 78, 79 are shown surrounding shaft 13 and received in counterbores 80, 81 respectively drilled in opposite faces of block 69. Threaded packing glands 82, 83 screwed into counterbores 80, 81 respectively will tighten packings 78, 79 respectively to insure a seal at the joint between the rotatable block 69 and the stationary hollow shaft 13. As shown in Fig. 1, a plurality of pins 84 are rigidly secured in openings provided in block 69 and each of said pins extends horizontally outwardly to a connection (not shown) with a clamp 85 which grips the upper end of one of the glass testing tubes 16–27. Thus the upper hub 14 participates in the support of the testing tubes. Similar pins 86 are secured to the lower hub 15 and extend outwardly to clamps 87 which grip the lower ends of the testing tubes so that the latter are supported in vertical positions, spaced equal distances from hubs 14, 15 and from each other to form a unitary assembly capable of being rotated by hand about the central support 13, 11.

The dew-point-indicating flash 34 (Fig. 2) is of glass and is sealed at its upper end by a stopper 90 through which tube 33 extends to discharge air passing out of upper hub 14 as already explained. Stopper 90 supports a highly polished metal tube 91 whose upper end is in the direct path of the air entering the flash from tube 33. The dew point is obtained by cooling metal tube 91 by means of a refrigerant placed in flask 34, for example, acetone and solid carbon dioxide, until dew starts to form on the polished outer surface of tube 91, then reading the temperature on a thermometer 92 placed in tube 91.

The specimen holders (Figs. 3 and 4) are each made up of a straight rod 93 of corrosion-resistant metal having semi-circular crossheads 94, 95 of corrosion-resistant metal adjustably secured thereon by setscrews (not shown). Arms 96, 97 form parts of the crossheads and extend horizontally. A spring clamp 98 is supported on the upper arm 96 and grips the upper end of a paper strip S, the specimen to be tested for elongation. The lower end of strip S supports a weighted spring clamp 99. The weight should be some recognized standard weight, e. g., 50 gm. per inch of width of the paper specimens. Arm 97 has a gage line 100 marked on it, and just prior to the test each paper strip will have a pencil or other mark made on edge (not shown) in alignment with gage line 100. The several rods 93 with the clamped and marked paper strips are inserted into the upper ends of the testing tubes 16–27, and the testing tubes are then sealed by their stoppers. The lower ends of rods 93 will be supported by the bottom stoppers 29 and the semi-circular crossheads will hold the rods and strips substantially vertical and substantially in the center of the testing tubes. Usually the specimens S will be 6½ in. to 8 in. long and ½ in. to ¾ in. wide. It will be observed that the paper strips hang freely, and preferably they are not in contact with the lower arms 97 so that expansion with a rise in humidity is free and no support or frictional contact is had from the lower crossheads or arms.

Miscroscope 101 (Fig. 1) covers a relatively narrow range of dimensional change which is indicated by the differential between the gage mark on the specimen S and the gage line 100 on arm 97 (Fig. 3) at the various humidity conditions established in the testing tubes. Miscroscope 101 contains an eyepiece scale graduated in thousandths of an inch. By using the edges of the gage mark on the specimen S and the gage line 100 on arm 97 as reference points, readings of 0.001 inch are easily reproducible. By using a specimen length of 6.5 inches, an accuracy of 1 part in 6500 is obtained. The per cent dimensional change is calculated by taking the difference between the lengths of specimen S at 50% relative humidity (the standard point of reference) and at the experimental relative humidity, dividing by the length of specimen S (usually 6.5 inches), and multiplying by 100. Exposure of the specimen S to relative humidities higher than 50% will cause expansion of specimen S to a greater length than the standard reference length. Exposure of the specimen S to relative humidities lower than 50% will cause contraction of specimen S to a lesser length than the standard reference length.

A feature of the described apparatus is the relatively small volumetric capacity of the system, which means that the air circulating through the system takes up the desired amount of moisture rapidly. This plus the small size of the sheet material specimens permits the system to come to equilibrium fairly quickly so that testing of the specimens may proceed with as little delay as possible. In this respect the described apparatus is a material improvement over the apparatuses of the prior art identified above.

Assuming that the specimens S are all in place and marked as with a pencil with gage marks that are aligned with gage lines 100 on arms 97 and further that the system is sealed against leakage to or contamination by the atmosphere, the microscope 101 is focused on the gage mark of the nearest testing tube and if necessary a lamp is brought to bear on the area of observation. Before observations are made, the microscope is carefully leveled, which is accomplished with the aid of a leveling tube 102. By circulating ambient air (50% relative humidity) through the tubes by means of the pump, the initial reference reading is taken, to be used as a basis for determination of dimensional changes at the desired humidities. The air is then forced to circulate through the set of bottles containing the highest humidity-producing salt solution in the system. Readings are taken every hour or half hour of both the dew-point and the change in paper dimensions, until equilibrium is attained; then the valve cocks are turned to make the air flow through the salt solution of next lower humidity. This procedure is continued until the paper specimens have been subjected to the three or more humidities afforded by the set-up. When the apparatus is functioning properly, it takes about two and one-half hours to obtain humidity and dimensional equilibrium for each salt solution. If rate of change of dimensions due to humidity is desired, readings at shorter time intervals may be made.

The described apparatus has been found to be quite useful in routine determinations of humidity expansion of paper, and may be adapted to the testing of other sheet materials. It permits simultaneous testing of twelve different paper specimens or twelve specimens of a single grade of paper.

What we claim is:

1. Apparatus for facilitating the measurement of the expansion under controlled humidity of hygroscopic sheet material specimens comprising, in combination, a support; a series of vertical specimen-holding testing tubes carried by the support and being transparent at least in part to permit visual inspection and measurement of the specimens from outside; conduit means connecting the testing tubes in series; all the testing tubes being hollow and sealed at both ends; air pump means and conduits connected to the series of testing tubes and constructed and arranged to force air through the testing tubes seriatim; a solution in a sealed container; conduit means delivering air from the series of testing tubes into said solution; conduit means to deliver air after passing through said solution to the suction side of the air pump means; and a specimen holder within each testing tube; the testing tubes being each of minimum dimensions to enclose the specimen holder and a specimen held thereby and to surround the specimen with a minimum volume of air; the entire apparatus providing a system sealed off from the atmosphere and being of small volumetric capacity so that the air circulated through the system will pick up its full complement of moisture, as determined by the character of the solution, within a minimum time.

2. Apparatus for measuring the elongation of hygroscopic sheet material specimens under controlled humidity conditions comprising, in combination, a central upright support; a plurality of sealed vertically disposed specimen containers having transparent walls and removable closures; means to secure the specimen containers rigidly but removably to the central support in a circular series surrounding the central support, said securing means being rotatable about the vertical axis of the central support; means to support a specimen within each container so that it hangs vertically and is visible through the transparent wall; a member within each container having a gage line as a reference mark against which dimensional change of the specimen is measured; means to circulate humidity conditioned air through the containers; and a microscope adapted to be focused on said gage lines and on marks put on the specimens to measure the amount of dimensional change of the specimens.

3. Apparatus for facilitating the measurement of the expansion under controlled humidity of hygroscopic sheet material specimens comprising, in combination, a plurality of testing tubes sealed off from the atmosphere and each having a transparent wall; a specimen holder supported within each testing tube, said holder including means for gripping a specimen at its upper end and means near the lower end of the specimen having a reference or gauge mark which, together with a mark on the specimen, may be viewed through said transparent wall; a microscope outside the testing tube assembly adapted to be focused on the specimens in the several testing tubes; a central vertical support having testing tube supporting means radiating outwardly therefrom, said supporting means holding each testing tube removably but rigidly in a vertical position; means built into said central support permitting rotation of the assembly of testing tubes about the vertical axis of said central support; a power-driven air pump; means for conducting air from the pressure side of the pump to one of the testing tubes; conduits connecting the testing tubes in series, so that air from the pump flows through the entire set of tubes; a solution container; and means to conduct air from the last one of the series of testing tubes to the solution container and through the solution and thence to the suction side of the pump.

4. The invention defined in claim 3, wherein the central vertical support includes a lower hollow chamber having conduit means coupling it with the pressure side of the air pump and other conduit means coupling it to one of the assembly of testing tubes; conduit means coupling all the testing tubes in series so that the air must flow from one end to the other of each testing tube in the assembly; said central vertical support also including an upper hollow chamber; conduit means coupling the upper hollow chamber with the last testing tube of the assembly; other conduit means coupling the upper hollow chamber with the solution container; and means to seal both chambers so that the air passes through both chambers without loss, whatever the angular position of the assembly of testing tubes.

5. The invention defined in claim 4, wherein there is a dew point indicator coupled between the discharge side of said upper chamber and the intake of said solution container, an air flow meter coupled between the pressure side of the air pump and said lower chamber, and a liquid trap or separator coupled between the solution container and the suction side of the air pump.

6. Apparatus for facilitating the measurement of the expansion under controlled humidity of hygroscopic sheet material specimens comprising, in combination, a testing tube sealed off from the atmosphere and having a transparent wall; a specimen holder supported within the testing tube adapted to grip a specimen at its upper end; means within the testing tube providing a reference or gauge mark which, together with an operator's mark on the specimen, may be viewed through said transparent wall; a microscope outside the testing tube adapted to be focused on specimens placed in said tube; means to hold the testing tube in a vertical position so that the specimen therein may hang freely from its supported upper end; a power-driven air pump; means for conducting air from the pressure side of the pump to the testing tube; a container holding humidifying solution; means to conduct air that has passed through the testing tube into the solution in said container; means to conduct the air humidified in the solution container to the suction side of the air pump; a dew point indicator interposed between the testing tube on its discharge side and the intake of the solution container; and a liquid trap interposed between the discharge side of the solution container and the suction side of the air pump.

7. Apparatus for facilitating the measurement of the expansion under controlled humidity of hygroscopic sheet material specimens comprising, in combination, a testing tube sealed off from the atmosphere and having a transparent wall; a specimen holder supported within the testing tube adapted to grip a specimen at its upper end; means within the testing tube providing a reference or gauge mark which, together with an operator's mark on the specimen, may be viewed through said transparent wall; a microscope outside the testing tube adapted to be focused on specimens placed in said tube; means to hold the testing tube in a vertical position so that the specimen therein may hang freely from its supported upper end; a power-driven air pump; conduit means for conducting air from the pressure side of the pump to the testing tube; a container holding humidifying solution; means to conduct air that has passed through the testing tube into the solution in said container; conduit means to conduct the air humidified in the solution container to the suction side of the air pump; an air flow meter coupled to the pressure side of the air pump; means coupling the air flow meter to the intake of the testing tube; an adjustable by-pass adjacent the air pump and coupled to the conduit means leading to the pressure and suction sides of the pump; a pressure relief valve in said by-pass; and a throttle valve in the conduit means leading from the pressure side of the pump to regulate the flow of air through the apparatus.

References Cited in the file of this patent

UNITED STATES PATENTS

| 1,642,577 | Carson | Sept. 13, 1927 |
| 1,757,931 | Brittain | May 6, 1930 |
| 1,885,209 | Koester | Nov. 1, 1932 |

OTHER REFERENCES

Elementary Treatise on Physics, by Ganot, 1898, p. 119.
Instrumentation, vol. 5, No. 6, 1st Quarter 1952, pp. 25–27, received Apr. 11, 1952.